United States Patent
McKenzie et al.

(10) Patent No.: US 10,923,127 B2
(45) Date of Patent: Feb. 16, 2021

(54) SYSTEM, METHOD, AND COMPUTER PROGRAM PRODUCT FOR AUTOMATICALLY ANALYZING AND CATEGORIZING PHONE CALLS

(71) Applicant: DIALOGTECH INC., Chicago, IL (US)

(72) Inventors: Amber McKenzie, Knoxville, TN (US); Ryan Bales, Chicago, IL (US); Kenneth Mitchner, Chicago, IL (US); Tim Hoolihan, Chicago, IL (US)

(73) Assignee: DIALOGTECH INC.

( * ) Notice: Subject to any disclaimer, the term of this patent is extended or adjusted under 35 U.S.C. 154(b) by 160 days.

(21) Appl. No.: 16/040,876

(22) Filed: Jul. 20, 2018

(65) Prior Publication Data
US 2019/0027151 A1 Jan. 24, 2019

Related U.S. Application Data

(60) Provisional application No. 62/534,732, filed on Jul. 20, 2017.

(51) Int. Cl.
G10L 17/00 (2013.01)
H04M 3/42 (2006.01)
H04M 3/51 (2006.01)
G10L 15/00 (2013.01)

(52) U.S. Cl.
CPC ......... *G10L 17/00* (2013.01); *H04M 3/42221* (2013.01); *G10L 15/00* (2013.01); *H04M 3/5133* (2013.01); *H04M 2201/60* (2013.01); *H04M 2203/301* (2013.01); *H04M 2203/303* (2013.01); *H04M 2203/305* (2013.01)

(58) Field of Classification Search
CPC ... G10L 15/22; G10L 2015/223; G10L 15/26; G10L 15/265; G10L 15/30; G10L 15/08; G10L 15/00; G10L 17/005; G06F 3/167; G06F 3/0482; G06F 3/16
See application file for complete search history.

(56) References Cited

U.S. PATENT DOCUMENTS

| 5,801,692 A * | 9/1998 | Muzio | G06F 3/04895 715/764 |
| 2003/0154072 A1* | 8/2003 | Young | G06F 16/40 704/9 |
| 2015/0237189 A1* | 8/2015 | Schultz | H04W 4/16 455/414.1 |

* cited by examiner

*Primary Examiner* — Edgar X Guerra-Erazo
(74) *Attorney, Agent, or Firm* — Barnes & Thornburg LLP

(57) ABSTRACT

Disclosed embodiments relate generally to systems and methods for automatically analyzing and categorizing phone calls for subsequent processing by telecommunications systems. Waveform and/or data analysis may automatically be performed on incoming call records in real or near real time.

15 Claims, 10 Drawing Sheets

SYSTEM, METHOD, AND COMPUTER PROGRAM PRODUCT FOR AUTOMATICALLY ANALYZING AND CATEGORIZING PHONE CALLS

CROSS REFERENCE

This patent application claims priority to U.S. Provisional Patent Application No. 62/534,732, filed Jul. 20, 2017, the disclosure of which is incorporated herein by reference in its entirety.

COPYRIGHT AUTHORIZATION

A portion of the disclosure of this patent document contains material which is subject to copyright protection. The copyright owner has no objection to the facsimile reproduction by anyone of the patent document, or the patent disclosure, as it appears in the Patent and Trademark Office patent file or records, but otherwise reserves all copyright rights whatsoever.

FIELD

Disclosed embodiments relate generally to systems and methods for automatically analyzing and categorizing phone calls for subsequent processing by telecommunications systems.

BACKGROUND

Customers contact businesses for a variety of reasons. Typically, a business must assign employees to monitor, or listen to calls in order to gather information about call purpose. This purpose may be, for example, to identify what calls may convert to sales (a "good call") versus what calls are about dis-satisfaction (i.e., a "bad" call).

SUMMARY

Given the sheer volume of calls, and inherent human subjectivity, it has been difficult if not impossible to objectively determine what characteristics of a call are indicative of particular customer intent, may be analyzed to determine call trends, or are associated with particular call outcomes. Moreover, the process for attempting to perform this analysis requires an excessive amount of time.

Accordingly, various disclosed embodiments provide a system, methods, and computer program products for automatically performing market categorization on large volumes of incoming calls.

DETAILED DESCRIPTION OF THE EMBODIMENTS

Attempts to automate call analytics processes have, to date, been primitive and lacked the level of customization required to provide accurate and reliable output. Examples of this include simple automated keyword scanners on calls. For example, a keyword scanner may tag all calls as generating an appointment if the word "appointment" is identified in the call. However, this low-level call analysis results in inaccurate tagging.

Various conventional web analytics systems for "call tracking" (i.e., the counting and gathering of marketing data on incoming voice phone calls that have been generated by a website) are available including SourceTrak™, which is available from DialogTech, Chicago, Ill. and is described in U.S. Ser. No. 13/601,447, filed Aug. 31, 2012, assigned to the assignee of the present invention, and incorporated herein by reference. These tracking mechanisms are technically useful for developing call insights and optimizing marketing and advertising strategies. Typically, in conjunction with call tracking, people will listen to the recorded calls to determine who is calling and why.

Automating and improving this "who" and "why" analysis is important to reduce costs, time and inaccuracies associated with this process. Therefore, it is technically useful and desirable for a call analyzer to use structured and unstructured data to automatically assign calls to client-tailored outcomes. Furthermore, it is technically useful and desirable for a call analyzer to improve its reliability and call categorization over time through machine learning.

Figure 1:
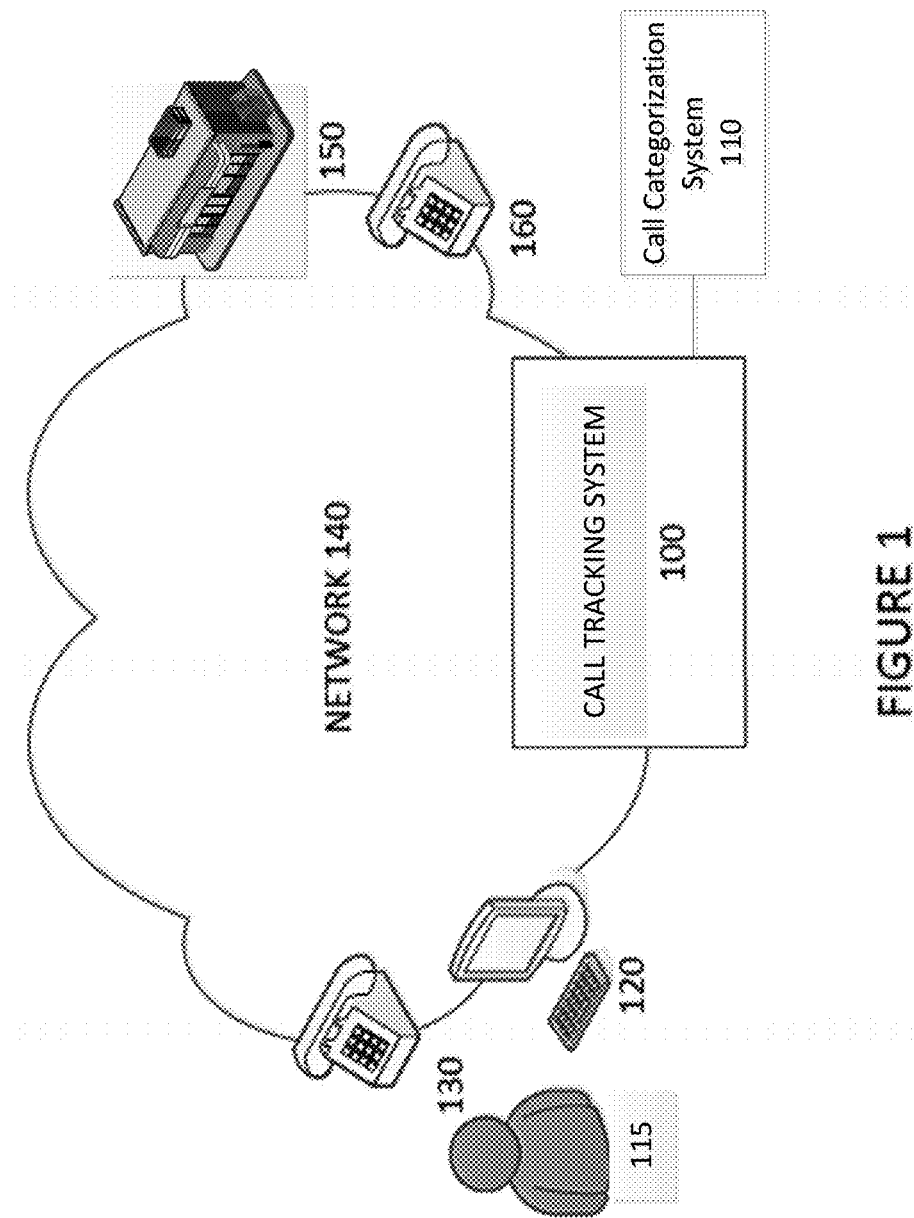
FIG. 1 illustrates a simplified block diagram of a call categorization system in conjunction with other components according to one disclosed embodiment.

Referring now to the drawings, wherein like reference numerals and characters represent like or corresponding parts and steps throughout each of the many views, there is shown in FIG. 1, a simplified block diagram of a call tracking system 100 for tracking a prospective customer's web-based activity and mapping that activity to a contact phone number displayed on a client's web site and potentially used by the prospective customer to contact the client to obtain the client's services.

As shown in FIG. 1, the call tracking system 100 is configured to support interactions between of a prospective customer 115 with a client's web site over a communication network 140. It should be understood that the communication network 140 may include more than one network and more than one type of network. Thus, by use of the term "network", it should be understood that the foregoing is not intended to limit the present invention to any particular wireline or wireless network, such as Local Area Networks (LANs), Metropolitan Area Networks (MANs), Wide Area Networks (WANs), a Public Switched Telephone Network (PSTN), or combinations thereof. Thus, the network 140 may simply comprise the Internet (also known as the "Web" or "World Wide Web"), but it may similarly comprise intranets, extranets, virtual private networks (VPNs), and the like.

The communication network 140 may be thought of as having more than one communication channel. Thus, the prospective customer 115 may communicate with the client in at least two channels: at the client's web site via the Internet and via a voice call over one or more telephone networks to a contact phone system 160 for the client 150, both networks being encompassed in the communication network 140. Accordingly, the prospective customer 115 may communicate with the client 150 via a computer 120 at the client's web site or via a phone 130 by calling the phone number(s) listed on the client's web site to contact the client.

The call tracking system 100 can be requested to interject itself into communication between the prospective customer 115 and the client's web site 200 by dynamically serving an individualized contact phone number for insertion into a web page included in the web site, as viewed by the prospective customer 115. Call tracking system 100 may incorporate call categorization system 110, as described below in order to extract accurate information from the subsequently placed call and associate it with a particular category of call.

Figure 2:
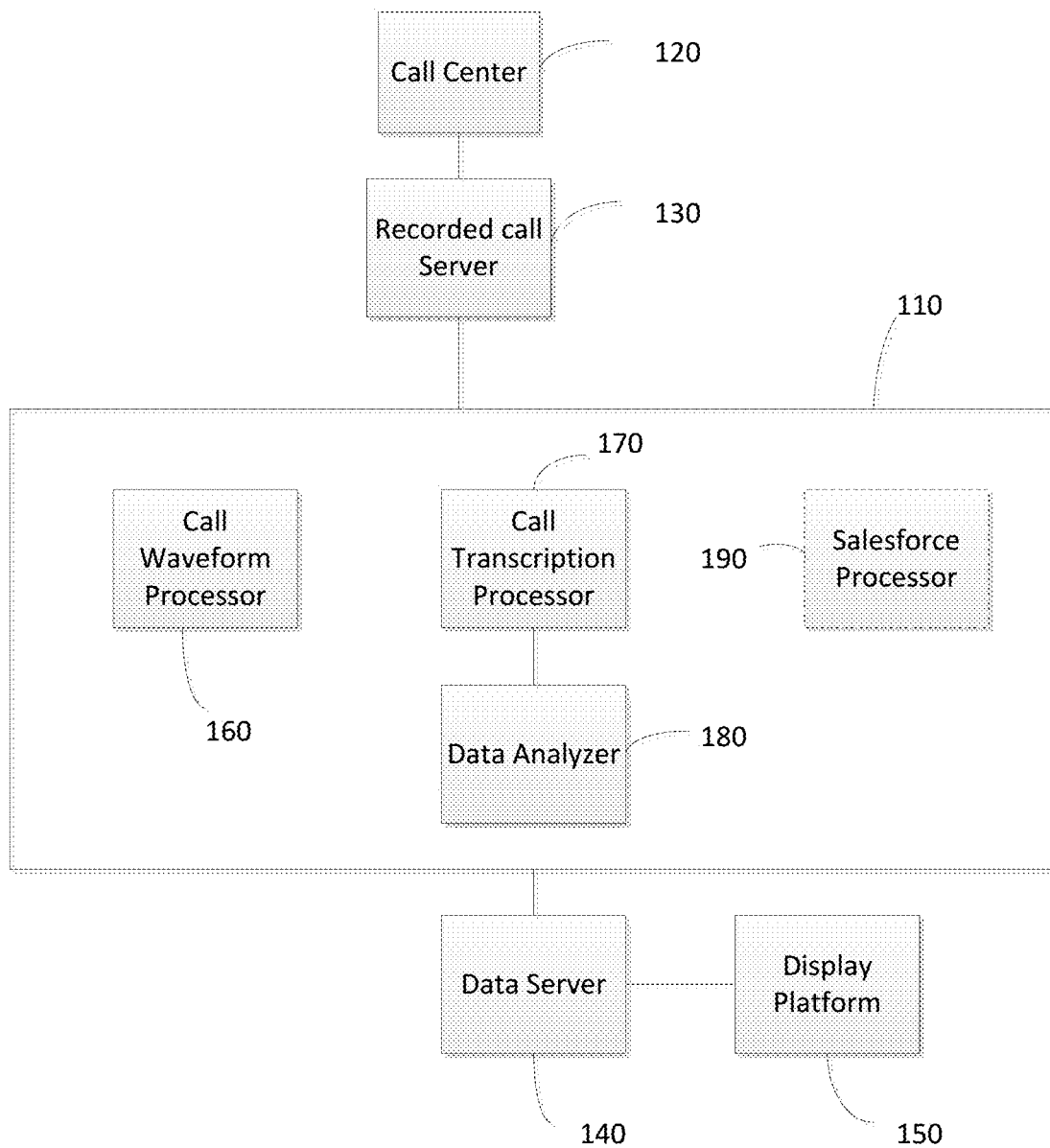
FIG. 2 illustrates simplified block diagram illustrative the call categorization system.

As shown in FIG. 2, the call categorization system 110 may be integrated into a call tracking system 100. Calls in a kinesis stream, for example, from a call center platform 120, may be automatically recorded in a call server 130 and then transmitted in real time to the call categorization system 110. The Kinesis stream may be part of Amazon Web Services (AWS) as part of the AWS cloud, for example. The call categorization system 110 may then process the recordings and output data to be saved to a server 140 and a client display platform 150.

Call categorization system 110 may include a call waveform processor 160, a call transcriber 170 and a call analytics processor 180. Call categorization system 110 may take input call records, transform the call records into useful forms to be processed, and output the call record in a format that provides meaning and insight to a user. Additional processors 190 for extracting other data from the call record, such as salesforce data associated with the call, may also be included in the call categorization system 110. Each of the waveform, analytics and additional processors in the system 110 may be configured to process the call kinesis stream in parallel. The call waveform processor 160 may perform amplitude analysis on each channel of the call in order to identify different call participants and the respective durations of time that the participants are speaking during the calls.

Call transcriber 170 and data analytics processor, or data analyzer 180 may transcribe the call and apply customized vectorization models to the transcription in order to categorize and apply a label to the call. This waveform and transcription data can be saved to server 140 and may be sent to a display 150 providing visualization of the calls as described further with respect to FIGS. 4A-4D.

Figure 3:
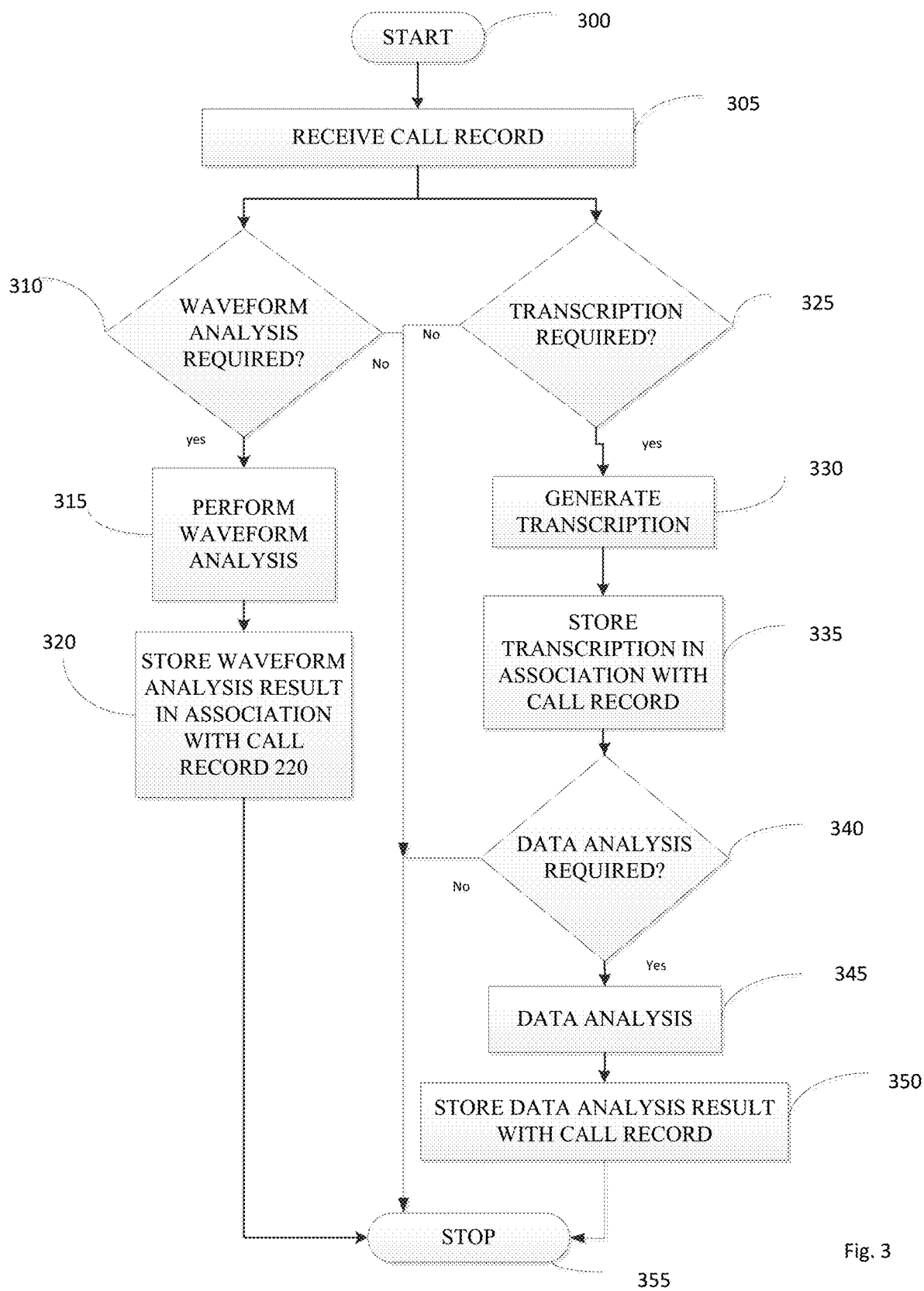
FIG. 3 illustrates an example of a methodology performed in accordance with a disclosed embodiment to categorize calls as part of call tracking.

FIG. 3 illustrates an example of a methodology performed in accordance with a disclosed embodiment to categorize calls. A call record may be received at 305 in real-time or in near real-time. The call record may include a recording of the call, time of the call, the phone number associated with the call, and any other relevant and structured data. It may be determined, in parallel, whether waveform analysis is required at 310 and whether transcription is required at 325 for the call record. This decision can be client specific, for example, when setting up the call categorization system. Additional parallel analyses to the call record can be added and performed as desired. If waveform analysis is required, it may be performed at 315. This analysis can include isolating and identifying audio waveforms for each person on the call in the call record. Relative duration of each waveform, and time in space (alternating speakers, all one person speaking, etc.) may also be determined during this analysis. The results of the analysis are then stored with the call record at 320.

If it is determined that transcription is required, then a transcription of the call record may be generated at 330. The transcription may be stored with the call record at 335. Next, it is determined if data analysis is required at 340. If it is determined that data analysis is required 340, the transcription is then analyzed 345 and stored with the call record 350.

Data analysis 345 may include feeding the data into a model that vectorizes the text data, analyzes the vectorization, and that tags the data with a call category label. Call categories may include sales, service, complaint, parts, etc. The model analysis utilizes hundreds of structured and unstructured data features in determining the call category. Examples of structured data include the word count, the number of back and forth exchanges between the call participants, call duration, time of call, day of call, etc. Unstructured data analyzed in the model may include hundreds of features such as keywords, keyword parts, keyword locations relative to other words, word patterns. The model is a machine learning model that will continuously update as it identifies particular trends in the structured and/or unstructured data associated with particular call categories.

The transcription, label, and call record are then stored at 350. All of the stored data, including call record, waveform analysis, call transcription, and data analysis, associated with the call record aggregated and saved at 355 and may presented to the client.

Figure 4A:
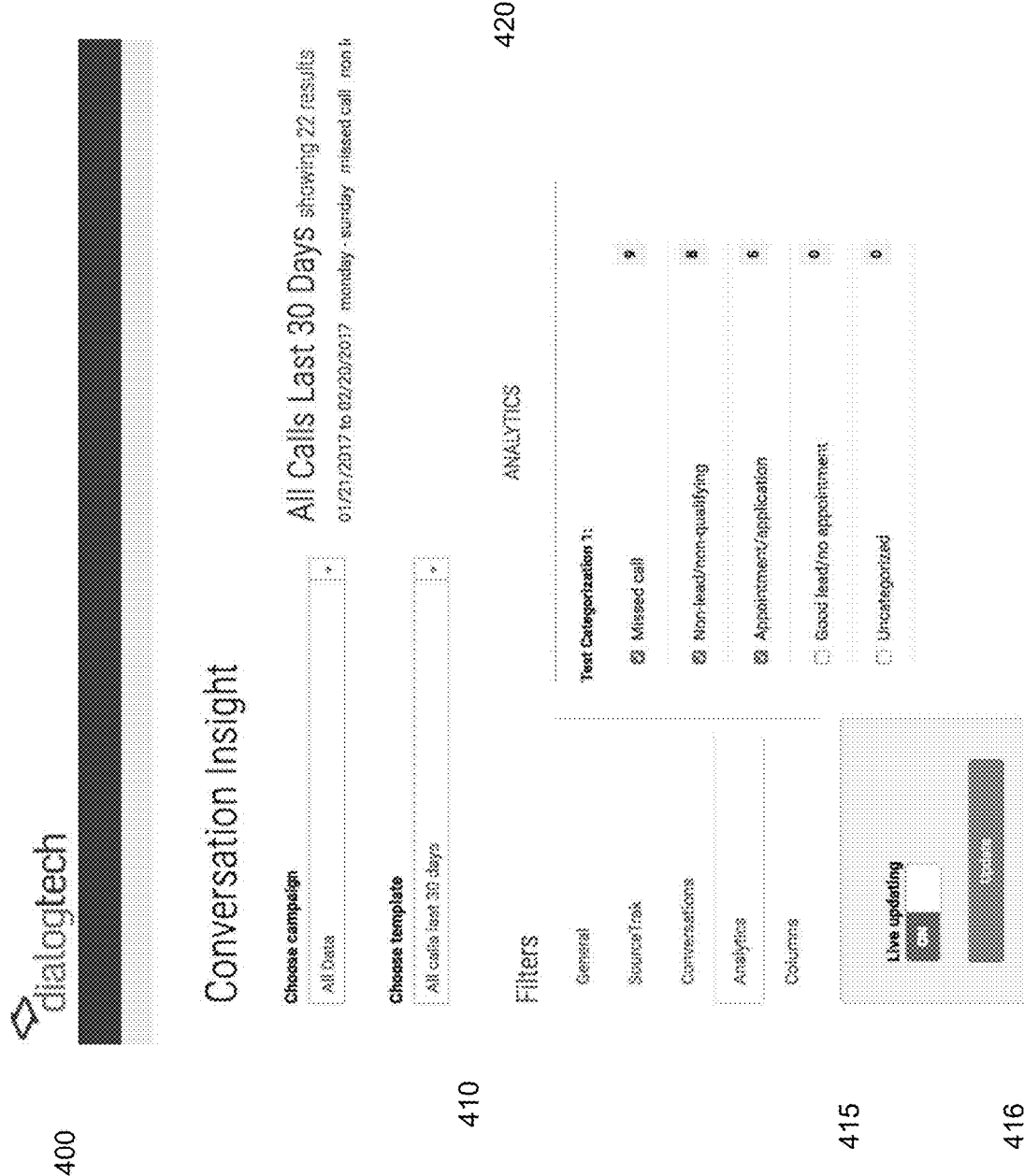
FIGS. 4A-C show various displayed outputs of the categorized calls.
Figure 4B:
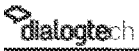
Figure 4C:
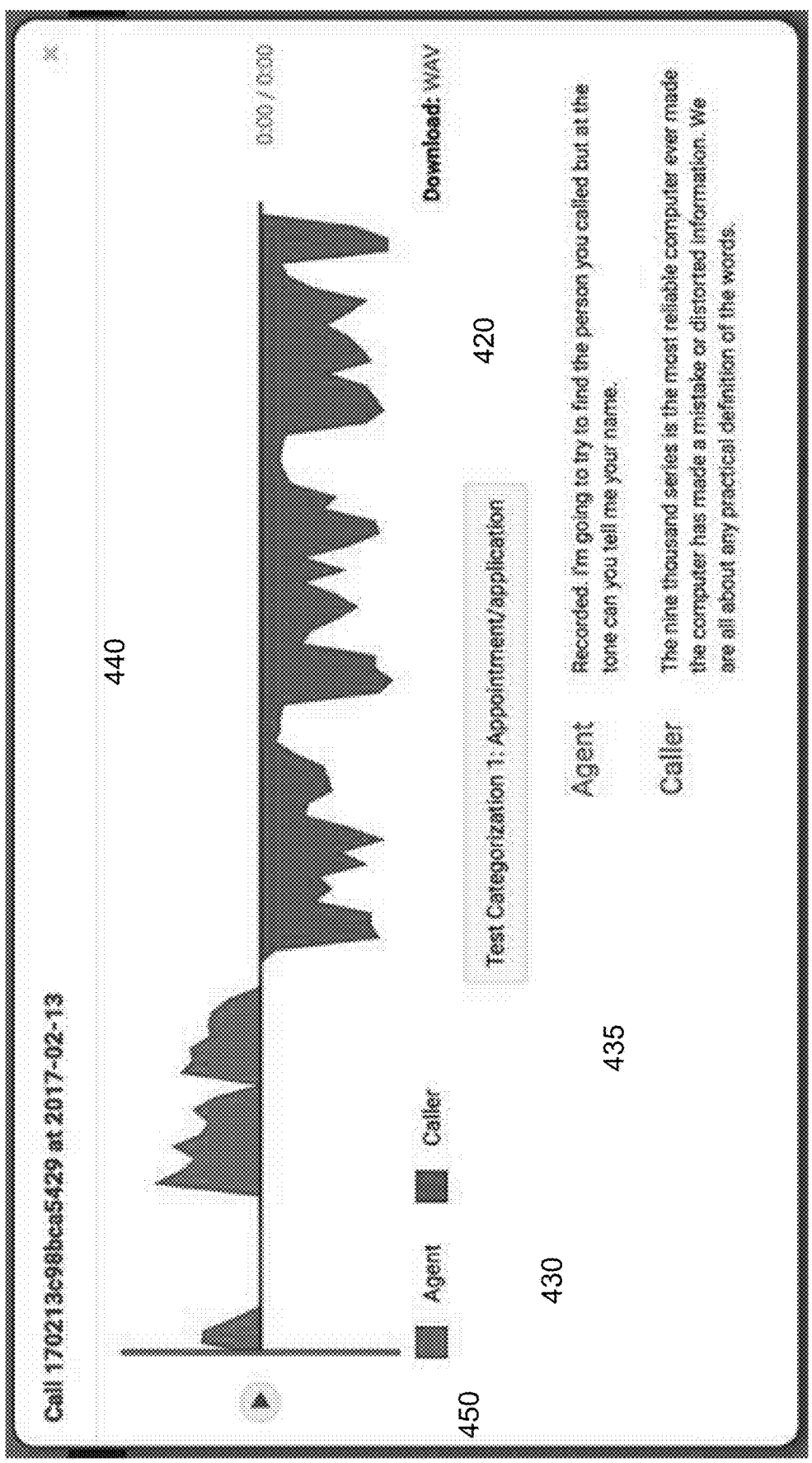

FIGS. 4A-C illustrate exemplary displays of saved waveform and transcription analysis. FIG. 4A shows an exemplary main page dashboard 400. Call records can be viewed and organized via various filters 410 including analytics 415. Within analytics, one or more call categories 420 may be selected or deselected for display. Updates to the lists of call categories can be selected to be live as incoming calls in the call kinesis stream are analyzed 416, or the client may elect to simply view only the calls that are already analyzed and saved at that point in time. Selected call categories 420 may be displayed, FIG. 4B, in a list along with date/time, caller ID, the dialed number, phone label, duration of call and call analysis, the call record recording, the transcription status, notes, and the category label for the call record.

Selection of a call may initiate output of a display in FIG. 4C. This display may output specific data for the call and may include a visual of the waveform including a breakdown of the call participants 430, the text transcription of the call 435, and audio of the call 440 along with the category 420, time and date of the call. Pressing the play button 450 may initiate output of a visual and/or audio walk-through of the call. The audio of the call may play while a status indicator bar travels along the waveform and call participants 430 and a highlighter highlights the corresponding word in the text.

Figure 5:
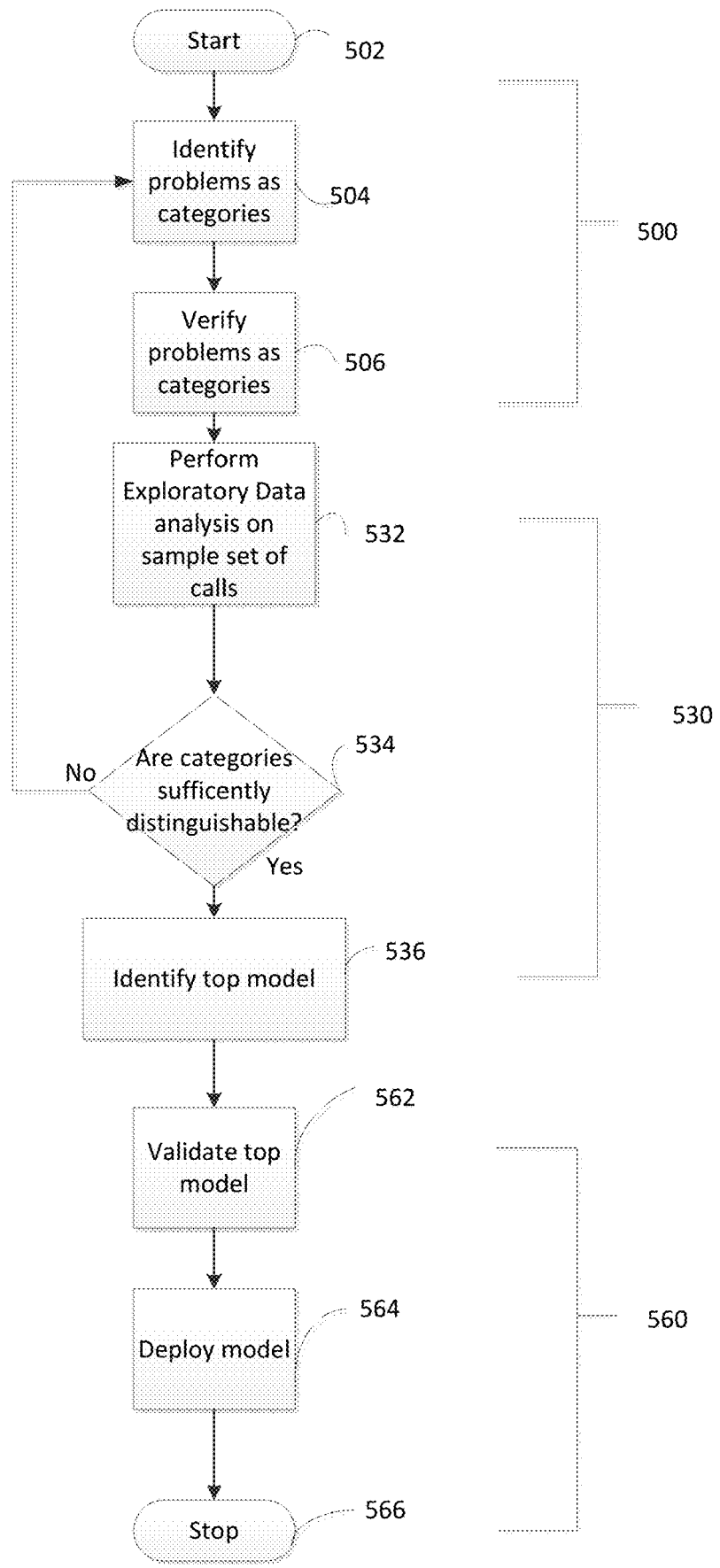
FIG. 5 illustrates an example of a methodology performed in accordance with a disclosed embodiment to customize the call categorization system.

FIG. 5 illustrates an example of a methodology performed in accordance with a disclosed embodiment to customize the call categorization system. As described above, the data analysis and categorization of calls may be customizable. Development of a unique system and method, according to the above-described embodiments, falls into three general operation phases: discovery 500, model building 530, and validation 560. Discovery, model building, and validation can occur through a software program or website platform with inputs for the client to enter the data needed to generate a model. During discovery 500, the process starts at 502 when a client identifies one or more problems or needs at 504. Examples of this include a need to distinguish sales calls, complaint calls, service calls, calls that converted versus calls that are leads, etc. This need is verified by analyzing a small sample of call records at 506. This analysis includes transcription and categorizing the calls.

A sample set is used to build a machine learning model for tagging each of the required call categories 530. A sample of call records is pulled to perform exploratory data analysis (EDA) at 532. Exemplary code used in EDA for data analysis and topic modeling may be found in Appendix A.

EDA may automatically clusterplot the calls to provide a visual output of similar features in calls of particular topics, or categories, to determine and provide a visualization as to whether the categories are sufficiently distinguishable at 534. If the categories overlap too much, then new problems or categories may be determined and analyzed. Distinguishable categories may then be used in model building and optimization.

During model building and optimization 536, a sample set of calls is transcribed and the text file is vectorized and run through a training model to extract features and determine patterns and identifiers for particular call categories. An example of software code for performing vectorization may be found in Appendix B. Model optimization based on these clusterplots may be repeated hundreds to thousands of times and the code may identify the top model at 536.

In validation 560, the top model may be tested by running a sample of call records through the model and determining the accuracy of the outcomes at 562. If the model operates at 80% or better accuracy at the validation operation, the model may be deployed 564 in the analysis system and the development may be complete at 566. In one embodiment, the model is a Convolutional Neural Network (CNN). By way of example, the code to implement the CNN may be found in Appendix C.

Figure 6A:
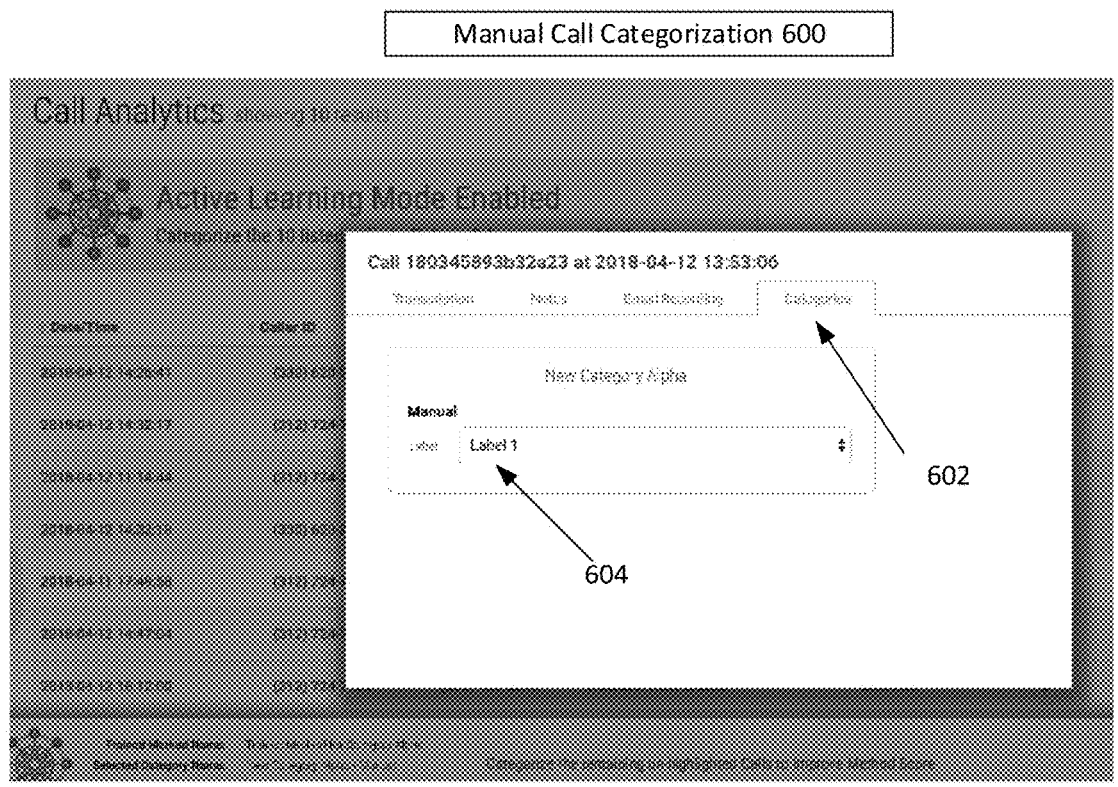
FIGS. 6A-6F show various customer end user interface displays for building custom categorization methods, or models.

Accordingly, the method of building a custom categorization system as described in FIG. 5 may be implemented through a customer-end interface dashboard as discussed in FIG. 4A. This dashboard features is known as "AutoDA" and enables customers to build out or change their platform as needed to train and build new models. For example, the discovery phase 500 may be a manual call categorization ("MCC") phase in which the customer is able to enter the call analytics platform, listen to calls and assign a category to each call within the user interface as seen in FIG. 6A. In MCC customers may develop their own unique a list of labels 602 for each new model category 604.

Figure 6B:
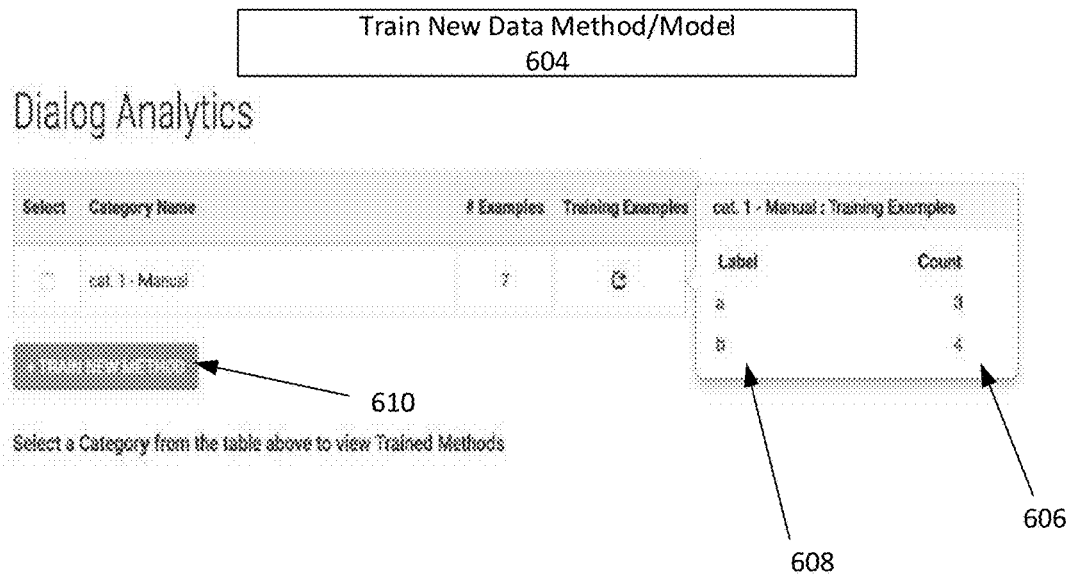

The customer may have access to and be able to review call manual call categorization counts 606 (i.e. number of examples labeled in the dataset) and for label data 608 and may click a "train new method" 610 button in FIG. 6B in order to launch a training process to train a model based on the new MCC data. This may launch the training process on the backend training servers, which follows the model building and optimization 536 and validation 560 operations as set forth in FIG. 5. In this embodiment, the customer can review the status 612 of the training progress and model building through their Dialog Analytics platform as depicted in FIG. 6C, showing for example that the status is still in the model request phase 614.

Figures 6C, 6D:
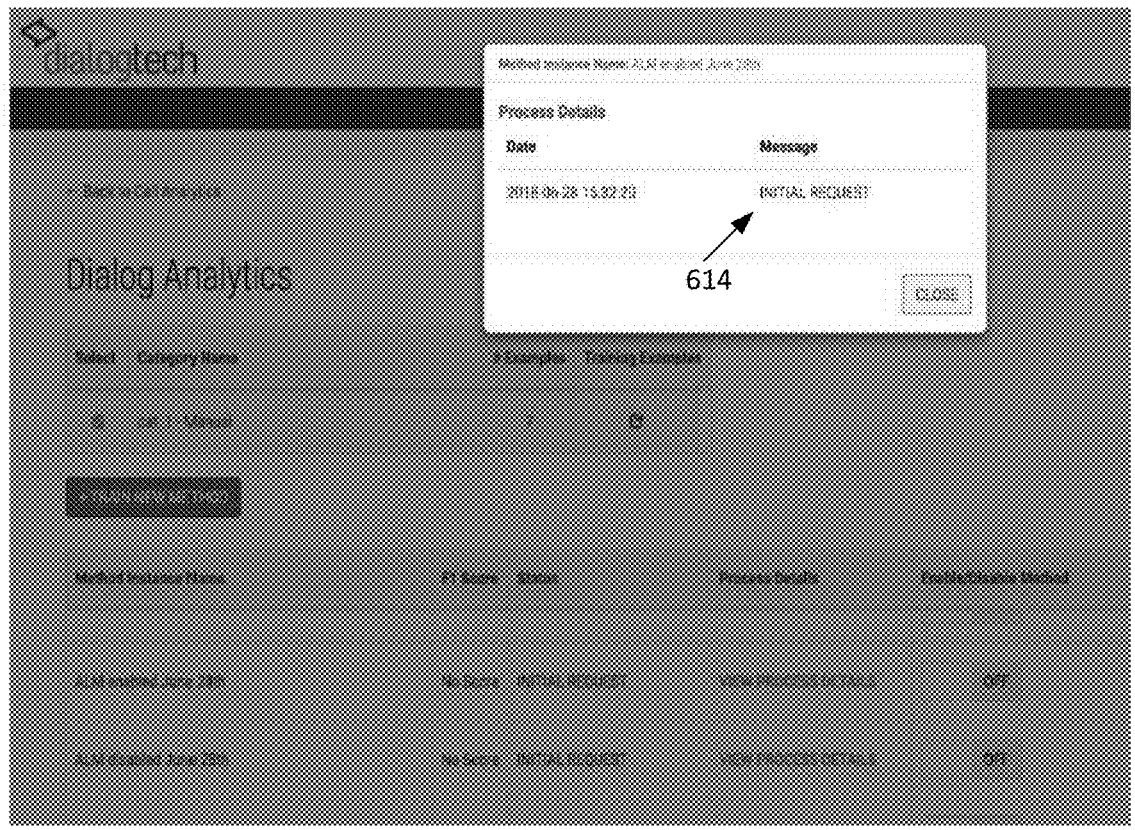

Further, in this embodiment, validation can include providing the final scores 616 for the model quality based on accuracy percentage in the model/method status Dialog Analytics platform as seen in FIG. 6D. Therefore, implementation of the model is customer selectable by way of, for instance, a toggle switch 620 to turn the model on. Therefore, the customer can dictate how accurate a model needs to be to be used. Once the model has been toggled to the on position, it will be executed for all new phone calls input to their account. In this user interface, models may be selectively turned on or off as needed by the customer. If a model is not found to be sufficiently accurate by the customer, the customer can continue to review and categorize additional calls and data via the MCC operations and launch another training process with the additional categorization data.

Figure 6E:
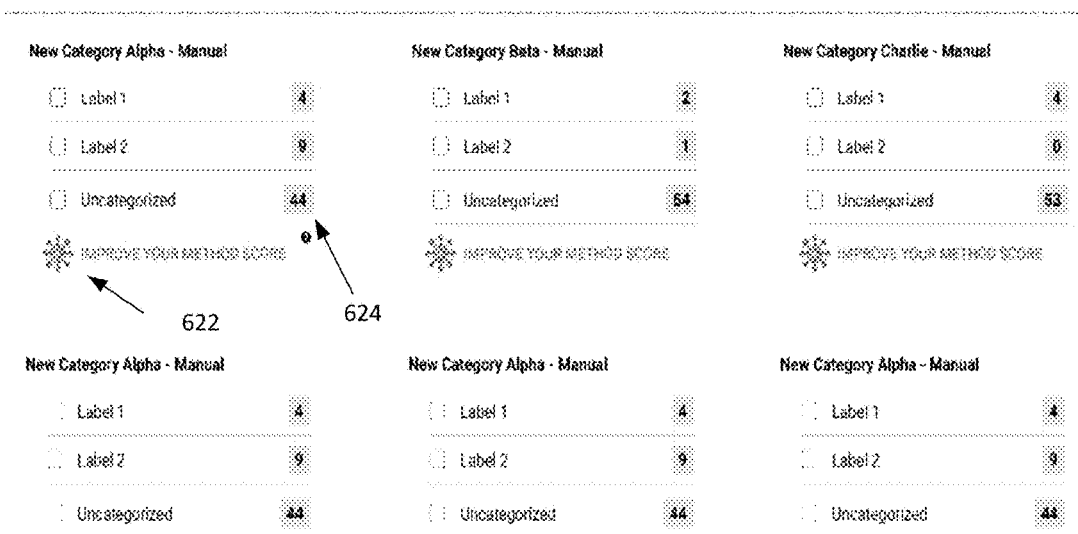
Figure 6F:
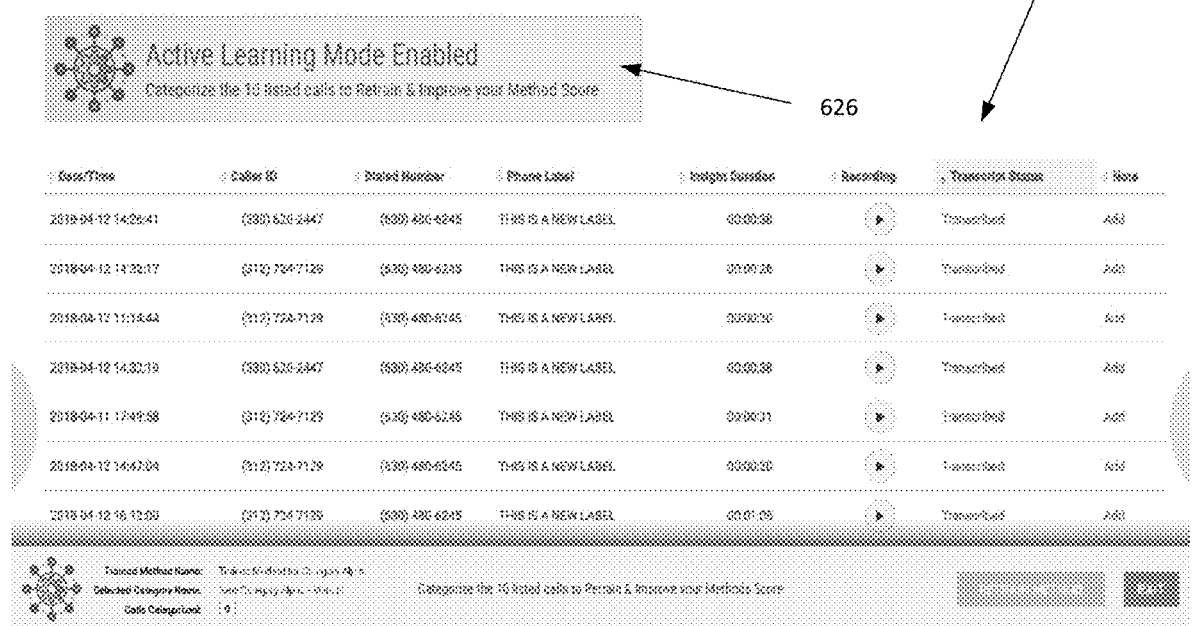

In some instances, the customer may be prompted or provided the option to enter "active learning mode" in order to obtain desired outputs at new data points or call features for some trained methods/models and improve model accuracy score 622 as shown in FIG. 6E. In this mode, the back end server processes of model training may include training the original, or classification model and training a second model called an active learning model. The active learning model can be used to calculate an uncertainty score, a high uncertainty score is indicative that the categorization model is unaware of many of the features in a particular data set, or that the features remain uncategorized 624. By way of example, the code to implement the Active Learning Mode may be found in Appendix C.

As seen, for example in FIG. 6E, each of the Alpha, Beta, and Charlie training models had a large number and large percentage of uncategorized call data compared with data assigned to Labels 1 and 2. After each training iteration, the active learning model can be executed on a random sample of stored historical phone calls, and calls are tagged with high uncertainty scores, or high numbers of features that are being overlooked by the model. These highest ranked calls 628 can be presented to the customer, upon selecting a button to improve the method score, to be categorized and labelled as part of an active learning mode 626 to retrain the model and improve its accuracy score as shown in FIG. 6E.

Exemplary embodiments have been discussed in detail herein. While specific exemplary embodiments have been discussed, it should be understood that this is done for illustration purposes only. In describing and illustrating the exemplary embodiments, specific terminology is employed for the sake of clarity. However, the embodiments are not intended to be limited to the specific terminology so selected. Persons of ordinary skill in the relevant art will recognize that other components and configurations may be used without departing from the true spirit and scope of the embodiments. It is to be understood that each specific element includes all technical equivalents that operate in a similar manner to accomplish a similar purpose. The examples and embodiments described herein are non-limiting examples.

Embodiments of the present invention may include apparatus/systems for performing the operations disclosed herein. An apparatus/system may be specially constructed for the desired purposes, or it may comprise a general-purpose apparatus/system selectively activated or reconfigured by a program stored in the apparatus/system.

Embodiments of the invention may also be implemented in one or a combination of hardware, firmware, and software. They may be implemented as instructions stored on a machine-readable medium, which may be read and executed by a computing platform to perform the operations described herein. A machine-readable medium may include any mechanism for storing or transmitting information in a form readable by a machine (e.g., a computer). For example, a machine-readable medium may include read only memory (ROM), random access memory (RAM), magnetic disk storage media, optical storage media, flash memory devices including thumb drives and solid state drives, and others.

In this description and the following claims, the terms "computer program medium" and "computer readable medium" may be used to generally refer to media such as, but not limited to removable storage drives, a hard disk installed in hard disk drive, and the like, etc. These computer program products may provide software to a computer system. Embodiments of the invention may be directed to such computer program products.

References to "one embodiment," "an embodiment," "example embodiment," "various embodiments," etc., may indicate that the embodiment(s) of the invention so described may include a particular feature, structure, or characteristic, but not every embodiment necessarily includes the particular feature, structure, or characteristic. Further, repeated use of the phrase "in one embodiment," or "in an exemplary embodiment," do not necessarily refer to the same embodiment, although they may.

Unless specifically stated otherwise, and as may be apparent from the following description and claims, it should be appreciated that throughout the specification descriptions utilizing terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

In a similar manner, the term "processor" may refer to any device or portion of a device that processes electronic data from registers and/or memory to transform that electronic data into other electronic data that may be stored in registers and/or memory. A "computing platform" may comprise one or more processors.

Further, the term computer readable medium is meant to refer to any machine-readable medium (automated data medium) capable of storing data in a format readable by a mechanical device. Examples of computer-readable media include magnetic media such as magnetic disks, cards, tapes, and drums, punched cards and paper tapes, optical disks, barcodes and magnetic ink characters. Further, computer readable and/or writable media may include, for example, a magnetic disk (e.g., a floppy disk, a hard disk), an optical disc (e.g., a CD, a DVD, a Blu-ray), a magneto-optical disk, a magnetic tape, semiconductor memory (e.g., a non-volatile memory card, flash memory, a solid state drive, SRAM, DRAM), an EPROM, an EEPROM, etc.). Examples of storage include cloud based, server based, and semiconductor memory (e.g., a non-volatile memory card, flash memory, a solid-state drive, SRAM, DRAM), an EPROM, an EEPROM, etc.).

While various exemplary embodiments have been described above, it should be understood that they have been presented by way of example only, and not limitation. Thus, the breadth and scope of the present invention should not be limited by any of the above-described exemplary embodiments, but should instead be defined only in accordance with the following claims and their equivalents.

Appendix A

```
from config import *
from file_utils import nte_docs
from basicStats import runBasicStats
from topicModeling import *
from clusterComp import getDocComp
from clusterplot import runClusterPlot try:
    text, cats = nte_docs(dataConfig["inputPath"], dataConfig["channel"])
except:
    print("Error importing data.")
    exit()

if runOptions["basicStats"]:
    print("Running basic stats...")
    if runBasicStats(text, dataConfig["outputPath"]):
        print("Basic stats complete. Output file stats.txt")
    else:
        print("Problem running basic stats.")

if runOptions["clusterPlot"]:
    print("Running cluster plot...")
    if runClusterPlot(clusterPlotConfig["vectorType"], text, cats, clusterPlotConfig["chi2"]):
        if clusterPlotConfig["vectorType"] == 0:
            print("Cluster plot complete using tfidf vectors. Output file is clusterplot-tfidf.png")
        if clusterPlotConfig["vectorType"] == 1:
            print("Cluster plot complete using count vectors. Output file is clusterplot-count.png")

if runOptions["topicModeling"]:
    print("Running topic modeling...")
    if not importData(dataConfig["inputPath"], malletConfig["malletPath"]):
        print("Problem importing data.")

for num in clusterConfig["clusters"]:
        print("Clustering with " + str(num) + " clusters...")
        clusterData(num, malletConfig["malletPath"], dataConfig["outputPath"])

if runOptions["clusterComposition"]:
    for num in clusterConfig["clusters"]:
        print("Getting cluster composition for " + str(num) + " clusters...")
        getDocComp(dataConfig["inputPath"], dataConfig["outputPath"], num, list(set(cats)))
    print("Cluster composition complete. Files in output directory.")
```

Appendix B

```python
import os
import re
import glob
import numpy as np
from keras.preprocessing.text import Tokenizer
from sklearn.preprocessing import LabelEncoder
from keras.utils import np_utils class TranscriptReader(object):
    def __init__(self, path, tokenizer=None):
        self._path = re.sub(r'/$', r'', path)
        self._label_encoder = None
        self._tokenizer = tokenizer
        self._max_len = None
        self._min_len = None
        self._raw_x = None
        self._raw_y = None
        self._vector_x = None
        self._vector_y = None
        self._matrix_x = None
        self._matrix_y = None def get_tokenizer(self):
        """ Get tokenizer
        :returns: tokenizer - tokenizer from X data
        :rtype: sklearn.preprocessing.text.Tokenizer
        """
        if self._tokenizer is None:
            self._tokenizer = Tokenizer()
            self._tokenizer.fit_on_texts(self.get_raw_x())
        return self._tokenizer def get_vocab_size(self):
        """ Get vocab size
        :returns: vocab_size - number of words in the training vocabulary
        :rtype: int
        """
        return len(self.get_tokenizer().word_counts)

def _import_raw(self, base_dir):
        """ Reads documents from folders where folder names represent category and sets class members
```

```
        :param base_dir: base directory which contains subdirectory of folders
containing data files
        :type base_dir: str
        """
        self._raw_x = []
        self._raw_y = []

for bucket in list(os.listdir(base_dir)):
            print(bucket)
            for item in glob.glob('{}/{}/*.txt'.format(base_dir, bucket)):
                d = open(item).read()
                d = self._clean_str(d)
                if self._max_len is None or len(d) > self._max_len:
                    self._max_len = len(d)
                if self._min_len is None or len(d) < self._min_len:
                    self._min_len = len(d)
                self._raw_x.append(d)
                self._raw_y.append(bucket)

@staticmethod
    def _clean_str(string, remove_apos=True):
        """ Tokenization/string cleaning.
        :param string: string to clean
        :type string: str
        :returns: string - cleansed string
        :rtype: str
        """
        string = string.strip().lower()
        string = re.sub(r"[^A-Za-z0-9\'`]", " ", string).strip()
        if remove_apos:
            string = re.sub(r"s\'", "s", string)
            string = re.sub(r"\'s", "s", string)
            string = re.sub(r"\'ve", "ve", string)
            string = re.sub(r"n\'t", "nt", string)
            string = re.sub(r"\'re", "re", string)
            string = re.sub(r"\'d", "ed", string)
            string = re.sub(r"\'ll", "ll", string)
        string = re.sub(r"\s{2,}", " ", string)
        return string
```

Appendix C

```
def model(max_document_length, vocab_size, num_categories, dropout=0.5, embedding_size=128,
num_filters=128, filter_sizes=[2, 3, 4], classification_layers=[], embedding_weights=None):
    # Input Layer
    model_input = Input(shape=(max_document_length,))

# Embedding Layer
    embed = Embedding(input_dim=vocab_size+1, output_dim=embedding_size,
input_length=max_document_length, init='uniform', weights=embedding_weights)(model_input)

# Generate Convolutional Neural Network for each filter_size with Pooling layer
    pooled_outputs = []
    for idx, window_size in enumerate(filter_sizes):
        conv = Convolution1D(
            nb_filter=num_filters,
            filter_length=window_size,
            init='normal')(embed)
        act = ParametricSoftplus()(conv)
        pool = MaxPooling1D(pool_length=max_document_length - window_size + 1,
border_mode='valid')(act)
        pooled_outputs.append(pool)

# Merge pool outputs
    merged = Merge(mode='concat')(pooled_outputs)

# Flatten output layers
    flat = Reshape((len(filter_sizes)*num_filters,))(merged)

# Dropout
    drop = Dropout(dropout)(flat)

for i in classification_layers:
        hidden = Dense(i, init='normal')(drop)
        act = ParametricSoftplus()(hidden)
        drop = Dropout(dropout)(act)

# Dense layer
    model_output = Dense(num_categories, activation='softmax', init='normal')(drop)
    model = Model(input=model_input, output=model_output)

# Optimizer
    model.compile(optimizer=Adam(epsilon=1e-07),
                  loss='categorical_crossentropy',
                  metrics=['categorical_accuracy'])
    return model
    # model.fit(X, y_mat, nb_epoch=5, batch_size=64, validation_data=(v_X, yv_mat))
```

Appendix D

```python
import os
import pickle
import json
import shutil
import numpy as np
from sklearn.svm import LinearSVC
from sklearn.feature_extraction.text import TfidfVectorizer
from sklearn.metrics import classification_report
from sklearn.model_selection import StratifiedKFold
from sklearn.pipeline import Pipeline
from sklearn.metrics import f1_score
import application def get_pipeline(trainer_params):
    # Training Hyperparams
    svc_params = trainer_params['svc']
    tfidf_params = trainer_params['tfidf']

# Setup Training Steps
    # Implement TF-IDF Vectorizer
    tfidf = TfidfVectorizer(norm=tfidf_params['norm'],
                sublinear_tf=tfidf_params['sublinear_tf'],
                min_df=tfidf_params['min_df'],
                max_df=tfidf_params['max_df'],
                ngram_range=tfidf_params['ngram_range'],
                analyzer=tfidf_params['analyzer'])

# Implement SVC
    svc = LinearSVC(dual=svc_params['dual'],
            tol=svc_params['tol'],
            class_weight=svc_params['class_weight'])

# Build Cross-Validation Pipeline
    pipe = Pipeline([('pre_process', tfidf),
            ('clf', svc)])

return pipe

# Trainer function
def train(training_parameters, config, data_reader, labels, logger):
    # Load Training Parameters
    acct_id             = training_parameters['acct_id']
    label_group_id      = training_parameters['label_group_id']
```

```python
manual_categorization_method_id = training_parameters['source_method_id']

# Setup config variables
python_virtual_env_path = config.get('python_virtual_env_path')
python_virtual_env_name = config.get('python_virtual_env_name')

# Document Hyperparams
trainer_params = config.get('methods')['tfidf_svc']

# Validation Hyperparams
cross_validation_splits = trainer_params['cross_validation_splits']

# Load Data
X     = data_reader.get_raw_x()
y_raw = data_reader.get_raw_y()

# Train Model via Cross-Validation
print('Starting Cross-Validation Process')
cv = StratifiedKFold(n_splits=cross_validation_splits, shuffle=True, random_state=None)
print('Split Count:', cv.get_n_splits(X, y_raw))

# Keep track of f1 between folds
f1_scores = []

fold_num = 0
for train_idx, val_idx in cv.split(X, y_raw):
    pipe_cv = get_pipeline(trainer_params)

fold_num += 1

# Split X
    X_train_cv = [X[idx] for idx in train_idx]
    X_validation = [X[idx] for idx in val_idx]

# Split y
    y_train_cv = [y_raw[idx] for idx in train_idx]
    y_validation = [y_raw[idx] for idx in val_idx]

# Train
    pipe_cv.fit(X_train_cv, y_train_cv)
    y_prediction = pipe_cv.predict(X_validation)

# Save f1 score
    fold_score = f1_score(y_validation, y_prediction, average='weighted')
    f1_scores.append(fold_score)

# Print messages
```

```
    print(json.dumps({
        'CV Iteration ': fold_num,
        'Train Size:': len(train_idx),
        'Val Size:': len(val_idx)
    }))
    print("Classification Report")
    print(classification_report(y_validation, y_prediction))

# Log average
f1_average = np.average(f1_scores)
logger.write_log("Cross validation completed with score of: {}".format(f1_average), accuracy=f1_average)
print("Cross validation completed with f1 score of: {}".format(f1_average))

# Full Dataset Training for Final Version of Model
print('Starting Full Dataset Training')

# Build Pipeline
pipe = get_pipeline(trainer_params)

# Train Final Model on Full Dataset
pipe.fit(X, y_raw)
print('Finished Full Dataset Training')

print('Saving Model')
# Save the Pipeline Steps
temp_method_name = training_parameters['trained_method_name']

# Create Directory to Save Model Files
output_path = 'temp/' + temp_method_name
os.makedirs(output_path)

# Save the TF-IDF Vectorizer
tfidf_file = temp_method_name + '_tfidf.pkl'
pickle.dump(pipe.named_steps['pre_process'], open(output_path + '/' + tfidf_file, 'wb'))

# Save the SKLearn SVC Model
model_file = temp_method_name + '_svc_clf.pkl'
pickle.dump(pipe.named_steps['clf'], open(output_path + '/' + model_file, 'wb'))

# Create Configuation Data Object
config_data = {
    "version": "1.0",
    "account_information":
        {
            "acct_id": acct_id,
            "label_group_id": label_group_id,
```

```
      "source_method_id": manual_categorization_method_id
    },
   "labels": labels,
   "training_parameters": {},
   "method_steps":
     {
        "tfidf": tfidf_file,
        "clf": model_file
     }
}

# Save Config File
config_file_name = temp_method_name + '_config.json'
with open(output_path + '/' + config_file_name, 'w') as model_config_file:
    application.shared.dialogtech.format_json_file(config_data, model_config_file)

# Create worker script
shutil.copy2('application/methods/tfidf_svc/worker.py', output_path + '/worker.py')

# Create run.sh
virtual_env_path = python_virtual_env_path + python_virtual_env_name
model_runner_file_name = 'run.sh'
runner = output_path + '/' + model_runner_file_name
with open(runner, 'w') as model_runner_file:
    model_runner_file.write(
        application.shared.dialogtech.build_model_runner(virtual_env_path,    'worker.py',
config_file_name))

return temp_method_name, output_path
```

What is claimed is:

1. A system for automatically processing call records comprising:
   a call records server that provides call recordings in real time upon completion of the call for analysis,
   a call records analyzer that provides parallel processing of waveform and transcription of the call records;
   means for categorizing the calls by processing structured features and unstructured data features through vectorization of the transcription so that the call records are objectively tagged and stored in groups of predetermined call categories, and
   a display, wherein selection of a stored call record displays specific data for the call including a visual waveform depicting a breakdown of the call participants, a text transcription of the call, playable audio of the call, category tag of the call, and time and date of the call,
   wherein the display further comprises a button that when pressed initiates output of a visual and audio walk-through of the call so that the audio of the call plays while a status indicator bar travels along visual waveform and a highlighter highlights the corresponding word text of the call.

2. The system of claim 1, wherein the means for processing structured features and unstructured data features comprises a call analytics processor.

3. The system of claim 2, wherein the call records analyzer comprises a call waveform processor is configured to isolate and identify audio waveforms for each participant in the call record.

4. The system of claim 2, wherein the call records analyzer comprises call transcriber that transcribes the audio data into text data.

5. The system of claim 4, wherein the call analytics processor comprises a model configured to vectorize the text data, analyze the vectorization and tag the data with a call category label.

6. The system of claim 1, wherein the structured data comprises one or more of word count, number of back and forth exchanges between call record participants, call duration, time of call, and day of call.

7. The system of claim 1, wherein the unstructured data comprises one or more of keywords, keyword parts, keyword locations relative to other words, and word patterns.

8. A method for automatic real-time call categorization comprising:
   receiving a call record comprising a recording of a call at a call categorization system,
   determining whether one or both of call transcription and waveform analysis of the call is required,
   in response to a determination that call transcription is required: transcribing the call into text data and storing the transcription with the call record, analyzing the text data by vectorization to determine a call category type of the call record, and tagging the call record with the determined call category type,
   storing a plurality of analyzed and categorized call records according to tagged call category, and in response to selection of a stored call record, displaying specific visual data for the call, wherein the specific visual data comprises a visual waveform showing a breakdown of call participants, a text transcription of the call, audio of the call and the category of the call, and
   initiating a visual and audio walk-through of the call so that the audio plays while a status indicator bar travels along the waveform including the breakdown of the call participants, and a highlighter highlights the corresponding word in the text transcription.

9. The method of claim 8, wherein in response to a determination that a waveform analysis of the call is required: isolating and identifying waveforms for each participant in the call in the call record and storing the isolated waveforms for each participant in the call record.

10. The method of claim 9, wherein the call transcription and waveform analysis are performed in parallel.

11. The method of claim 8, wherein the text data is analyzed and vectorized via a model.

12. The method of claim 11, wherein the model is a machine learning model that continuously updates as it identifies trends in structured and unstructured data in call records associated with particular call categories.

13. The method of claim 12, wherein the unstructured data comprises hundreds of features including keywords, keyword parts, keyword locations relative to other words, and word patterns.

14. The method of claim 13, wherein the structured data comprises word count, number of back and forth exchanges between call participants, call duration, and time of call.

15. The method of claim 12, wherein the call categories are customizable to the user of the system, and the machine learning model is trained using sample call record structured and unstructured data.

* * * * *